(12) United States Patent
Nakamura et al.

(10) Patent No.: US 11,525,064 B2
(45) Date of Patent: *Dec. 13, 2022

(54) TEXTILE PRINTING INK JET INK COMPOSITION AND TEXTILE PRINTING INK JET INK COMPOSITION SET

(71) Applicant: Seiko Epson Corporation, Tokyo (JP)

(72) Inventors: Tasuku Nakamura, Matsumoto (JP); Kosuke Chidate, Shiojiri (JP); Hideki Okada, Shiojiri (JP); Masakazu Ohashi, Shiojiri (JP); Takako Sugiyama, Azumino (JP)

(73) Assignee: SEIKO EPSON CORPORATION

( * ) Notice: Subject to any disclaimer, the term of this patent is extended or adjusted under 35 U.S.C. 154(b) by 454 days.

This patent is subject to a terminal disclaimer.

(21) Appl. No.: 16/695,399

(22) Filed: Nov. 26, 2019

(65) Prior Publication Data

US 2020/0165474 A1 May 28, 2020

(30) Foreign Application Priority Data

Nov. 27, 2018 (JP) .............................. JP2018-220934

(51) Int. Cl.
| C08G 18/80 | (2006.01) |
| C09D 11/322 | (2014.01) |
| C09D 11/40 | (2014.01) |
| C09B 19/00 | (2006.01) |
| D06P 1/44 | (2006.01) |
| C08L 69/00 | (2006.01) |
| C08K 5/01 | (2006.01) |
| C09B 47/04 | (2006.01) |

(52) U.S. Cl.
CPC ............ *C09D 11/322* (2013.01); *C08G 18/80* (2013.01); *C08K 5/01* (2013.01); *C08L 69/00* (2013.01); *C09B 19/00* (2013.01); *C09B 47/04* (2013.01); *C09D 11/40* (2013.01); *D06P 1/44* (2013.01)

(58) Field of Classification Search
USPC .................................. 428/195.1, 208; 347/20
See application file for complete search history.

(56) References Cited

U.S. PATENT DOCUMENTS

| 4,046,729 | A | 9/1977 | Scriven et al. |
| 4,290,988 | A | 9/1981 | Nopper et al. |
| 4,382,758 | A | 5/1983 | Nopper et al. |
| 6,051,645 | A | 4/2000 | Suzuki et al. |
| 6,770,331 | B1 * | 8/2004 | Mielke ................. C09D 17/001 427/508 |

(Continued)

FOREIGN PATENT DOCUMENTS

| EP | 3382093 A1 | 10/2018 |
| JP | S55-090659 A | 7/1980 |

(Continued)

OTHER PUBLICATIONS

Extended European Search Report for Application No. EP 19 16 3291 dated Jul. 22, 2019 (7 pages).

*Primary Examiner* — Terressa Boykin
(74) *Attorney, Agent, or Firm* — Harness, Dickey & Pierce, P.L.C.

(57) ABSTRACT

A textile printing ink jet ink composition includes a dioxazine pigment, a resin particle, and a lubricant, wherein the content of the dioxazine pigment is 0.5 to 1.5 mass % based on the total amount of the ink composition.

9 Claims, 3 Drawing Sheets

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|---|---|---|---|---|---|---|
| PIGMENT | PIGMENT DISPERSION 1 | 1.0 | 1.5 | 0.5 | 1.0 | 1.0 | 1.0 | 1.0 | 1.0 | 1.0 | 1.0 | 1.0 | 1.0 | 1.0 | 1.0 | 1.0 |
| | PIGMENT DISPERSION 2 | - | - | - | - | - | - | - | - | - | - | - | - | - | - | - |
| RESIN PARTICLE | RESIN 1 | 5.0 | 5.0 | 5.0 | 5.5 | 4.0 | 6.0 | 3.0 | - | - | 5.0 | 5.0 | 5.0 | 5.0 | 5.0 | 5.0 |
| | RESIN 2 | - | - | - | - | - | - | - | 5.0 | - | - | - | - | - | - | - |
| | RESIN 3 | - | - | - | - | - | - | - | - | 5.0 | - | - | - | - | - | - |
| LUBRICANT | LUBRICANT 1 | 1.0 | 1.0 | 1.0 | 1.0 | 1.0 | 1.0 | 1.0 | 1.0 | 1.0 | 2.0 | 0.5 | - | - | 2.5 | 0.4 |
| | LUBRICANT 2 | - | - | - | - | - | - | - | - | - | - | - | 1.0 | - | - | - |
| | LUBRICANT 3 | - | - | - | - | - | - | - | - | - | - | - | - | 1.0 | - | - |
| ORGANIC SOLVENT | GLYCEROL | 20 | 20 | 20 | 20 | 20 | 20 | 20 | 20 | 20 | 20 | 20 | 20 | 20 | 20 | 20 |
| | TRIETHYLENE GLYCOL | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | PROPYLENE GLYCOL | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | TRIETHYLENE GLYCOL MONOBUTYL ETHER | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| SURFACTANT | BYK348 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| WATER | DEIONIZED WATER | BALANCE | BALANCE | BALANCE | BALANCE | BALANCE | BALANCE | BALANCE | BALANCE | BALANCE | BALANCE | BALANCE | BALANCE | BALANCE | BALANCE | BALANCE |
| COLOR PROPERTIES | BRIGHTNESS | A | A | B | A | A | A | A | A | A | A | A | A | A | A | A |
| | SATURATION | A | B | A | A | A | A | A | A | A | A | A | A | A | A | A |
| FASTNESS PROPERTIES | DRY CLEANING CONTAMINATION DEGREE | A | A | A | A | A | A | B | B | A | A | A | A | A | A | A |
| | RUBBING FASTNESS DEGREE | A | B | A | A | B | A | B | B | A | B | A | A | A | A | A |
| STABILITY | PRESERVATION | A | A | A | B | A | B | A | A | B | B | A | B | B | B | B |
| | AGGREGATE | A | A | A | A | B | A | A | B | A | A | A | A | B | B | B |

(56) References Cited

U.S. PATENT DOCUMENTS

| | | |
|---|---|---|
| 9,096,771 B2 | 8/2015 | Okuda et al. |
| 9,321,921 B2 | 4/2016 | Namba |
| 9,624,393 B2 | 4/2017 | Ohta et al. |
| 2001/0043243 A1 | 11/2001 | Tachihara et al. |
| 2010/0091052 A1 | 4/2010 | Ogawa et al. |
| 2013/0201252 A1 | 8/2013 | Namba |
| 2015/0204015 A1 | 7/2015 | Gomi et al. |
| 2016/0193754 A1 | 7/2016 | Gomi et al. |
| 2017/0121543 A1 | 5/2017 | Sakaguchi et al. |
| 2017/0203478 A1 | 7/2017 | Gomi et al. |
| 2018/0072073 A1 | 3/2018 | Makuta |
| 2018/0244935 A1 | 8/2018 | Sakaguchi et al. |
| 2018/0257104 A1 | 9/2018 | Che et al. |
| 2020/0095439 A1 | 3/2020 | Okada et al. |

FOREIGN PATENT DOCUMENTS

| | | |
|---|---|---|
| JP | H03-076885 A | 4/1991 |
| JP | H08-157758 A | 6/1996 |
| JP | 2009-030014 A | 2/2009 |
| JP | 2010-106377 A | 5/2010 |
| JP | 2013-176972 A | 9/2013 |
| JP | 2016-186146 A | 10/2016 |
| JP | 2017-043681 A | 3/2017 |
| JP | 2017-155110 A | 9/2017 |
| NO | 2017-098920 A1 | 6/2017 |

* cited by examiner

FIG. 1

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|---|---|---|---|---|---|---|
| PIGMENT | PIGMENT DISPERSION 1 | 1.0 | 1.5 | 0.5 | 1.0 | 1.0 | 1.0 | 1.0 | 1.0 | 1.0 | 1.0 | 1.0 | 1.0 | 1.0 | 1.0 | 1.0 |
| | PIGMENT DISPERSION 2 | - | - | - | - | - | - | - | - | - | - | - | - | - | - | - |
| RESIN PARTICLE | RESIN 1 | 5.0 | 5.0 | 5.0 | 5.5 | 4.0 | 6.0 | 3.0 | - | - | 5.0 | 5.0 | 5.0 | 5.0 | 5.0 | 5.0 |
| | RESIN 2 | - | - | - | - | - | - | - | 5.0 | - | - | - | - | - | - | - |
| | RESIN 3 | - | - | - | - | - | - | - | - | 5.0 | - | - | - | - | - | - |
| LUBRICANT | LUBRICANT 1 | 1.0 | 1.0 | 1.0 | 1.0 | 1.0 | 1.0 | 1.0 | 1.0 | 1.0 | 2.0 | 0.5 | - | - | 2.5 | 0.4 |
| | LUBRICANT 2 | - | - | - | - | - | - | - | - | - | - | - | 1.0 | - | - | - |
| | LUBRICANT 3 | - | - | - | - | - | - | - | - | - | - | - | - | 1.0 | - | - |
| ORGANIC SOLVENT | GLYCEROL | 20 | 20 | 20 | 20 | 20 | 20 | 20 | 20 | 20 | 20 | 20 | 20 | 20 | 20 | 20 |
| | TRIETHYLENE GLYCOL | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | PROPYLENE GLYCOL | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | TRIETHYLENE GLYCOL MONOBUTYL ETHER | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| SURFACTANT | BYK348 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| WATER | DEIONIZED WATER | BALANCE | BALANCE | BALANCE | BALANCE | BALANCE | BALANCE | BALANCE | BALANCE | BALANCE | BALANCE | BALANCE | BALANCE | BALANCE | BALANCE | BALANCE |
| COLOR PROPERTIES | BRIGHTNESS | A | A | B | A | A | A | A | A | A | A | A | A | A | A | A |
| | SATURATION | A | B | A | A | A | A | A | A | B | A | A | A | A | A | A |
| FASTNESS PROPERTIES | DRY CLEANING CONTAMINATION DEGREE | A | A | A | A | A | A | A | B | B | A | B | B | A | A | A |
| | RUBBING FASTNESS DEGREE | A | B | A | B | B | B | B | B | B | B | A | A | A | A | A |
| STABILITY | PRESERVATION | A | A | A | A | A | A | A | A | A | A | A | A | A | A | A |
| | AGGREGATE | A | A | A | A | A | B | A | A | B | A | A | A | B | B | B |

FIG. 2

|  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|
| PIGMENT | PIGMENT DISPERSION 1 | 2.0 | 0.4 | - | 1.0 | 1.0 |
|  | PIGMENT DISPERSION 2 | - | - | 1.0 | - | - |
| RESIN PARTICLE | RESIN 1 | 5.0 | 5.0 | 5.0 | - | 5.0 |
|  | RESIN 2 | - | - | - | - | - |
|  | RESIN 3 | - | - | - | - | - |
| LUBRICANT | LUBRICANT 1 | 1.0 | 1.0 | 1.0 | 1.0 | - |
|  | LUBRICANT 2 | - | - | - | - | - |
|  | LUBRICANT 3 | - | - | - | - | - |
| ORGANIC SOLVENT | GLYCEROL | 20 | 20 | 20 | 20 | 20 |
|  | TRIETHYLENE GLYCOL | 4.0 | 4.0 | 4.0 | 4.0 | 4.0 |
|  | PROPYLENE GLYCOL | 2.0 | 2.0 | 2.0 | 2.0 | 2.0 |
|  | TRIETHYLENE GLYCOL MONOBUTYL ETHER | 1.0 | 1.0 | 1.0 | 1.0 | 1.0 |
| SURFACTANT | BYK348 | 0.3 | 0.3 | 0.3 | 0.3 | 0.3 |
| WATER | DEIONIZED WATER | BALANCE | BALANCE | BALANCE | BALANCE | BALANCE |
| COLOR PROPERTIES | BRIGHTNESS | A | C | C | A | A |
|  | SATURATION | C | B | A | A | A |
| FASTNESS PROPERTIES | DRY CLEANING CONTAMINATION DEGREE | A | A | A | C | B |
|  | RUBBING FASTNESS DEGREE | B | A | A | C | B |
| STABILITY | PRESERVATION | A | A | A | A | A |
|  | AGGREGATE | A | A | A | A | C |

FIG. 3

| | | INK OF EXAMPLE 1 | INK SET OF EMBODIMENT | | INK SET OF COMPARATIVE EXAMPLE | |
|---|---|---|---|---|---|---|
| | | | INK H | INK I | INK H | INK I |
| PIGMENT | PIGMENT DISPERSION 1 | 1.0 | - | - | - | - |
| | PIGMENT DISPERSION 3 | - | 4.0 | - | 4.0 | - |
| | PIGMENT DISPERSION 4 | - | - | 4.0 | - | 4.0 |
| RESIN PARTICLE | RESIN 1 | 5.0 | 5.0 | 5.0 | 5.0 | 5.0 |
| LUBRICANT | LUBRICANT 1 | 1.0 | 1.0 | 1.0 | 1.0 | 1.0 |
| ORGANIC SOLVENT | GLYCEROL | 20 | 20 | 20 | 20 | 20 |
| | TRIETHYLENE GLYCOL | 4.0 | 4.0 | 4.0 | 4.0 | 4.0 |
| | PROPYLENE GLYCOL | 2.0 | 2.0 | 2.0 | 2.0 | 2.0 |
| | TRIETHYLENE GLYCOL MONOBUTYL ETHER | 1.0 | 1.0 | 1.0 | 1.0 | 1.0 |
| SURFACTANT | BYK348 | 0.3 | 0.3 | 0.3 | 0.3 | 0.3 |
| WATER | DEIONIZED WATER | BALANCE | BALANCE | BALANCE | BALANCE | BALANCE |
| FASTNESS PROPERTIES | RUBBING FASTNESS DEGREE | | A | | B | |

TEXTILE PRINTING INK JET INK COMPOSITION AND TEXTILE PRINTING INK JET INK COMPOSITION SET

The present application is based on, and claims priority from, JP Application Serial Number 2018-220934, filed Nov. 27, 2018, the disclosure of which is hereby incorporated by reference herein in its entirety.

BACKGROUND

1. Technical Field

The present disclosure relates to a textile printing ink jet ink composition and a textile printing ink jet ink composition set including the textile printing ink jet ink composition.

2. Related Art

A textile printing ink jet ink composition that is suitable for printing to a fabric has been proposed (for example, JP-A-2017-155110). The textile printing ink jet ink composition described in JP-A-2017-155110 includes resin dispersoids (resin particles), a color material, water, and at least one of a UV absorber and a light stabilizer and is prevented from being discolored by UV light, such as sunlight, to enhance the light resistance of a printed fabric. Furthermore, a film formed of resin particles protects the color material, makes it difficult for the color material to fall off, and enhances the fastness properties of the printed fabric.

However, the textile printing ink jet ink composition described in JP-A-2017-155110 has room for a change for the better in terms of improving all of color development properties, fastness properties, and stability.

SUMMARY

The textile printing ink jet ink composition according to an aspect of the present disclosure comprises a dioxazine pigment, a resin particle, and a lubricant, wherein the content of the dioxazine pigment is 0.5 to 1.5 mass % based on the total amount of the ink composition.

In the textile printing ink jet ink composition, the dioxazine pigment may be C.I. Pigment Violet 23.

In the textile printing ink jet ink composition, the resin particle may be a urethane resin particle.

In the textile printing ink jet ink composition, the resin particle may be a particle of a resin having a polycarbonate skeleton.

In the textile printing ink jet ink composition, the resin particle may be particle of a urethane resin having a cross-linkable group.

In the textile printing ink jet ink composition, the cross-linkable group may be a block isocyanate.

In the textile printing ink jet ink composition, the lubricant may be a polyethylene wax.

In the textile printing ink jet ink composition, the lubricant may be one having a melting point of 130° C. or more.

In the textile printing ink jet ink composition, the content of the lubricant may be 0.4 to 2.5 mass % based on the total amount of the ink composition.

The textile printing ink jet ink composition set according to an aspect of the present disclosure comprises the textile printing ink jet ink composition described above and a cyan ink composition containing a phthalocyanine pigment.

BRIEF DESCRIPTION OF THE DRAWINGS

FIG. 1 is a table showing a relationship between the composition and the performance of textile printing ink jet ink compositions according to Embodiment 1.

FIG. 2 is a table showing a relationship between the composition and the performance of textile printing ink jet ink compositions according to Comparative Examples.

FIG. 3 is a table showing a relationship between the composition and the performance of the textile printing ink jet ink composition set according to Embodiment 2 a relationship between the composition and the performance of the textile printing ink jet ink composition set according to Comparative Example.

DESCRIPTION OF EXEMPLARY EMBODIMENTS

Embodiments of the present disclosure will now be described. However, the embodiments are merely examples of the present disclosure and do not limit the disclosure and can be appropriately modified without departing from the technical idea of the present disclosure.

Embodiment 1

FIG. 1 is a table showing a relationship between the composition and the performance of textile printing ink jet ink compositions according to Embodiment 1. FIG. 2 is a table showing a relationship between the composition and the performance of textile printing ink jet ink compositions according to Comparative Examples.

Incidentally, in the following description, a textile printing ink jet ink composition according to this embodiment is referred to as an example ink, and a textile printing ink jet ink composition according to a comparative example is referred to as a comparative example ink. An ink jet ink composition including a textile printing ink jet ink composition according to the embodiment or a textile printing ink jet ink composition according to a comparative example is referred to as an ink.

The example ink is used for printing on a fabric. First, the outline of an example ink will be described with refence to FIG. 1.

As shown in the item column at the leftmost column of FIG. 1, each example ink contains a dioxazine pigment, a resin particle, and a lubricant, and the content of the dioxazine pigment is 0.5 to 1.5 mass % based on the total amount of the ink composition.

As shown in the item column at the leftmost column of FIG. 2, comparative example inks differ from example inks in the contents of the ink composition and the concentrations of the ink composition.

The example ink contains a pigment as the color material. The example ink contains, as the pigment, 0.5 to 1.5 mass % of a dioxazine pigment based on the total amount of the ink composition. The dioxazine pigment is a polycyclic pigment including two oxazine rings in one molecular. The dioxazine pigment exhibits a purple color and is excellent in, for example, color development properties, light resistance, and heat resistance.

As the dioxazine pigment, for example, C.I. (Colour Index Generic Name) Pigment Violet 37 and C.I. Pigment Violet 23 can be used.

C.I. Pigment Violet 23 exhibits a brilliant purple color, and C.I. Pigment Violet 37 exhibits a reddish purple color. That is, C.I. Pigment Violet 23 exhibits a pure purple color with no redness or blueness compared to C.I. Pigment Violet 37. From such a viewpoint of exhibiting a pure purple color with no redness or blueness, C.I. Pigment Violet 23 is superior to C.I. Pigment Violet 37.

The dioxazine pigment has excellent color properties at a low pigment concentration compared to other pigments having similar hue (for example, quinacridone pigment). For example, color properties of an ink containing about 4 mass % of a quinacridone pigment can be obtained by 0.5 to 1.5 mass % of a dioxazine pigment.

In the ink of the embodiment, since the content of the pigment can be relatively low, when the ink is applied onto a recording medium, the rate of the pigment coated by resin particles and so on is increased. As a result, the ink of the embodiment can have satisfactory fastness properties.

The content of the dioxazine pigment may be 0.7 mass % or more and 1.3 mass % or less, further 0.8 mass % or more and 1.2 mass % or less, based on the total amount of the textile printing ink jet ink composition.

The example ink contains resin particles.

As the resin of the resin particles, for example, an acrylic resin, a styrene-acrylic resin, a fluorene resin, a urethane resin, a polyolefin resin, a rosin-modified resin, a terpene resin, a polyester resin, a polyamide resin, an epoxy resin, a vinyl chloride resin, a vinyl chloride-vinyl acetate copolymer, and an ethylene-vinyl acetate copolymer can be used. As the resin particles, one resin may be used alone, or a mixture of two or more resins may be used.

The resin particles form a resin film including the color material, i.e., a colored coating film, in the vicinity of the surface of the fabric. Since the dioxazine pigment is included in the resin film, the dioxazine pigment hardly penetrates into or between the fibers constituting the fabric, and the dioxazine pigment stays in the vicinity of the surface of the fabric and is fixed in the vicinity of the surface of the fabric. Furthermore, since the dioxazine pigment is included in the resin film, the dioxazine pigment is hardly detached from the surface of the fabric.

The resin particles may be urethane resin particles and may be further particles of a urethane resin having a polycarbonate skeleton. In addition, the urethane resin may be one having a crosslinkable group. In such a case, the fastness properties and the stability of the ink composition are further improved. The crosslinkable group may be a block isocyanate group.

The resin particles may have an average particle diameter of about 10 to 300 nm. The average particle diameter of the resin particles is based on the volume and can be measured with, for example, a particle size distribution measuring apparatus of which the measurement principle is a laser diffraction scattering method. Examples of the particle size distribution measuring apparatus include a particle size distribution analyzer of which the measurement principle is a dynamic light scattering method.

The content of the resin particles may be 1 to 10 mass %, 3 to 6 mass %, or 4 to 5.5 mass %, based on the total amount of the textile printing ink jet ink composition. In such a content, the stability and the fastness properties of the ink composition can be further improved.

The example ink includes a lubricant.

The lubricant is a compound having a hydrophilic part and a hydrophobic part and may be in a particulate form. Such a lubricant is selectively oriented on the surface of the coating film to express a variety of functions such as slip properties and water repellent properties.

As such a lubricant, for example, calcium stearate, ammonium stearate, silicone wax, fluorine wax, microcrystal wax, polyethylene wax, paraffin wax, carnauba wax, and polyethylene-paraffin wax can be used. Such lubricants may be used alone or as a mixture of two or more thereof. From the viewpoint of stability, the lubricant may be polyethylene wax.

The lubricant penetrates between the resin particles to reduce collision between the resin particles and suppresses the generation of aggregate (foreign substance) derived from the resin due to collision between the resin particles. If collision between resin particles often occurs, the resin particles aggregate to generate resin-derived aggregate (foreign substance).

Furthermore, the lubricant forms a protective layer that protects the colored coating film. For example, when a strong external force is locally applied to an image formed by the colored coating film, the protective layer formed by the lubricant is deformed to spread on the surface of the colored coating film, and the influence of the external force to the colored coating film is reduced to suppress the abrasion of the colored coating film. For example, when a fabric on which an image is formed by the example ink is washed by a method such as dry cleaning, color fade-out hardly occurs, and fastness properties and abrasion resistance are improved.

The above-described effect of reducing collision between resin particles and suppressing the generation of aggregate can be achieved to a certain degree also by containing a large amount of a pigment. However, in this embodiment, the content of the pigment, a dioxazine pigment, is restricted to 0.5 to 1.5 mass %. Although the effect of suppressing the generation of aggregate by such a small content is insufficient, the dispersion stability of resin particles can be improved by using together with the lubricant.

The content of the lubricant may be 0.4 to 2.5 mass %, 0.5 to 2.0 mass %, or 0.7 to 1.8 mass % based on the total amount of the textile printing ink jet ink composition. In such a content, the stability of the ink composition can be improved.

The lubricant may have a melting point of 130° C. or more. When the melting point is 130° C. or more, the polarizability is sufficient, and aggregate due to collision between dispersoids including a lubricant is hardly generated. In addition, melting does not occur even if stored in a high-temperature environment, there is no risk of causing a change in viscosity or particle diameter to also show excellent storage stability. The melting point of the lubricant may be 133° C. or more or 135° C. or more.

The example ink may contain an organic solvent.

As the organic solvent, for example, lower alcohols (e.g., methanol, ethanol, 1-propanol, isopropanol, 1-butanol, 2-butanol, isobutanol, and 2-methyl-2-propanol), glycols (e.g., ethylene glycol, diethylene glycol, triethylene glycol, tetraethylene glycol, and tripropylene glycol), glycerol, acetins (e.g., monoacetin, diacetin, and triacetin), derivatives of glycols (e.g., triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether), 1-methyl-2-pyrrolidone, β-thiodiglycol, and sulfolane can be used. Such organic solvents may be used alone or as a mixture of two or more thereof.

The organic solvent suppresses evaporation of water of the example ink to enhance the moisture retention properties of the example ink. Furthermore, the organic solvent adjusts the viscosity of the example ink.

When an organic solvent is contained, the content of the organic solvent may be 10 to 50 mass %, 15 to 40 mass %, or 20 to 35 mass % based on the total amount of the textile printing ink jet ink composition.

The example ink may contain a surfactant.

The surfactant reduces the surface tension of the example ink and improves the wettability of the example ink to a recording medium such as a fabric. As the surfactant, for example, an acetylene glycol surfactant, a silicone surfactant, and a fluorine surfactant can be used.

The example ink may contain water.

Water is a solvent for dispersing the dioxazine pigment, the resin particles, and the lubricant. As the water, for example, pure water and ultrapure water, such as deionized water, ultrafiltration water, reverse osmosis water, and distilled water, can be used.

Thus, the example ink contains a dioxazine pigment, a resin particle, and a lubricant, and the content of the dioxazine pigment is 0.5 to 1.5 mass % based on the total amount of the ink composition. Furthermore, the example ink may contain an organic solvent and water and may further contain a pH adjuster, a preservative, a fungicide, and a crosslinking agent.

In FIGS. 1 and 2, the ink composition and evaluation items regarding ink performance are shown in the item column at the leftmost column, and the ink types are shown in the item column at the uppermost row. Specifically, the inks are the inks of Examples 1 to 15 and the inks of Comparative Examples 1 to 5. FIGS. 1 and 2 summarize the ink composition and the results of evaluation of ink performance of each ink.

The numerical values shown in FIGS. 1 and 2 represent the contents of each component based on the total amount of the ink composition, and the unit is mass percent (mass %) unless specified otherwise. Incidentally, the concentrations of effective components, i.e., the pigment dispersion, the resin particle, and the lubricant, contained in each ink composition are each stated in mass percent concentration.

Furthermore, in FIGS. 1 and 2, the concentration of water is stated as balance. The balance means the mass percent concentration obtained by subtracting the concentrations of ink compositions excluding water from 100 mass % when the total concentration of the ink compositions including water is 100 mass %.

Embodiment 2

The ink set of this embodiment is a textile printing ink jet ink composition set including a textile printing ink jet ink composition and a cyan ink containing a phthalocyanine pigment. The textile printing ink jet ink composition contains a dioxazine pigment, a resin particle, and a lubricant, and the content of the dioxazine pigment is 0.5 to 1.5 mass % based on the total amount of the ink composition.

The textile printing ink jet ink composition containing a dioxazine pigment, a resin particle, and a lubricant, wherein the content of the dioxazine pigment is 0.5 to 1.5 mass % based on the total amount of the ink composition, can be the textile printing ink jet ink composition described in Embodiment 1.

The cyan ink containing a phthalocyanine pigment is not particularly limited and may contain a resin particle and a lubricant. The components other than the pigment may be the same as those of the textile printing ink jet ink composition described in Embodiment 1.

The phthalocyanine pigment may be any pigment having a phthalocyanine skeleton in the structure and may be copper phthalocyanine, blue copper phthalocyanine, or Colour Index Generic Name Pigment Blue 15. Examples of such a pigment include C.I. Pigment Blue 15:3, C.I. Pigment Blue 15:4, and C.I. Pigment Blue 15:6. In particular, C.I. Pigment Blue 15:3 may be used. By using such a pigment, the color tone of the cyan ink can be well expressed.

The content of the phthalocyanine pigment may be 1 to 10 mass %, 2 to 8 mass %, or 3 to 5 mass % based on the total amount of the cyan ink. In such a content, the color development properties can be further improved.

Although the ink containing a phthalocyanine pigment may be slightly inferior in rubbing fastness properties, the ink set of the embodiment is an ink composition set including a specific textile printing ink jet ink containing a dioxazine pigment, and consequently the rubbing fastness properties can be improved and the color reproduction area of a blue color can be extended.

The ink set of the embodiment may be a textile printing ink jet ink composition set further including a magenta ink. In such an ink set, the rubbing fastness properties can be improved and the color reproduction area of a blue color can be extended, compared to a known ink set (for example, an ink set of a cyan ink and a magenta ink).

The magenta ink is not particularly limited and may contain a color material, a resin particle, and a lubricant. The components other than the color material may be the same as those of the textile printing ink jet ink composition described in Embodiment 1.

The magenta ink may contain a quinacridone pigment as the color material. Examples of such a pigment include C.I. Pigment Red 202. By using such a pigment, the color tone of the magenta ink can be well expressed.

The content of the color material in the magenta ink may be 1 to 10 mass %, 2 to 8 mass %, or 3 to 5 mass % based on the total amount of the magenta ink. In such a content, the color development properties can be further improved.

EXAMPLES

Example Corresponding to Embodiment 1

Next, the details of the compositions of the example inks and the comparative inks and the details of the methods for evaluating the performance of the example inks and the comparative inks will be described with reference to FIGS. 1 and 2, but the present disclosure is not limited the following examples.

As shown in FIGS. 1 and 2, the example inks and the comparative example inks each contain pigment dispersion 1 or pigment dispersion 2 as the pigment.

The pigment dispersions 1 and 2 are each prepared by mixing 1.5 parts by mass of 30 mass % ammonia (neutralizer) with 80.5 parts by mass of deionized water, stirring the mixture, then dissolving 8 parts by mass of an acrylic-acrylate copolymer as a resin dispersant in the mixture, further adding 10 parts by mass of a pigment to the mixture, and performing dispersion treatment for 10 hours with a ball mill using zirconia beads. The pigment concentrations in the pigment dispersions 1 and 2 are each 10 mass %.

Pigment dispersion 3 (see FIG. 3) described below has the same components as those of the pigment dispersions 1 and 2.

The pigment as an effective component included in the pigment dispersion 1 is C.I. Pigment Violet 23, which is a dioxazine pigment. Accordingly, the pigments in the example inks and the pigments in the inks of Comparative Examples 1, 2, 4, and 5 are dioxazine pigments.

The pigment as an effective component included in the pigment dispersion 2 is a non-dioxazine pigment. Accordingly, the pigment in the ink of Comparative Example 3 is a non-dioxazine pigment. Specifically, C.I. Pigment Violet 19 is used as the pigment in the ink of Comparative Example 3.

C.I. Pigment Violet 19 as the non-dioxazine pigment is a quinacridone pigment having a condensed polycyclic aromatic skeleton having a condensed aromatic ring and has excellent heat resistance and solvent resistance.

For example, in the ink of Example 1, a concentration of the dioxazine pigment 1 of 1.0 mass % means that the concentration of the dioxazine pigment included in the pigment dispersion 1 is 1.0 mass % based on the total amount of the ink composition. For example, in the ink of Comparative Example 3, a concentration of the pigment dispersion 2 of 1.0 mass % means that the concentration of the non-dioxazine pigment (quinacridone pigment) included in the pigment dispersion 2 is 1.0 mass % based on the total amount of the ink composition.

The resin particles of the example inks and the resin particles of the comparative example inks are particles of any of resin 1, resin 2, and resin 3.

The resin 1 is a urethane resin having a block isocyanate crosslinkable group and is specifically Turboset 2025 (trade name) manufactured by The Lubrizol Corporation. The resin 2 is a urethane resin having no crosslinkable group and is specifically Hydran WLS-213 (trade name) manufactured by DIC Corporation. The resin 3 is an acrylic resin having a crosslinkable group and is specifically Movinyl 966A (trade name) manufactured by Japan Coating Resin Corporation.

For example, in the ink of Example 1, a concentration of the resin 1 of 5.0 mass % means that the concentration of the urethane resin as an effective component included in the resin 1 is 5.0 mass % based on the total amount of the ink composition. For example, in the ink of Example 9, a concentration of the resin 3 of 5.0 mass % means that the concentration of the acrylic resin as an effective component included in the resin 3 is 5.0 mass % based on the total amount of the ink composition.

The lubricants of the example inks and the lubricants of the comparative example inks are any of lubricant 1, lubricant 2, and lubricant 3.

The lubricant 1 is a polyethylene wax having a high melting point of 137° C. and is specifically Hitec E-9015 (trade name) manufactured by TOHO Chemical Industry Co., Ltd. The lubricant 2 is a polyethylene wax having a low melting point of 106° C. and is specifically Hitec E-8237 (trade name) manufactured by TOHO Chemical Industry Co., Ltd. The lubricant 3 is a paraffin wax having a melting point of 90° C. and is specifically AQUACER 497 (trade name) manufactured by BYK Chemie GmbH.

For example, in the ink of Example 1, a concentration of the lubricant 1 of 1.0 mass % means that the concentration of the polyethylene wax having a high melting point as an effective component included in the lubricant 1 is 1.0 mass % based on the total amount of the ink composition.

The organic solvents of the example inks and the organic solvents of the comparative example inks are each, for example, glycerol, triethylene glycol, propylene glycol, or triethylene glycol monobutyl ether.

The surfactants of the example inks and the surfactants of the comparative example inks are each a silicone surfactant and is specifically BYK-348 (trade name) manufactured by BYK Chemie GmbH.

The water of the example inks and the water of the comparative example inks are each deionized water.

The example inks and the comparative example inks are each produced by putting each component shown in the figure in a container, mixing the mixture with a magnetic stirrer for 2 hours, and then filtering the mixture through a membrane filter with a pore size of 5 μm.

For example, the ink of Example 1 produced by the above-described method is composed of a dioxazine pigment having a concentration of 1.0 mass %, a urethane resin having a concentration of 5.0 mass %, a high-melting point polyethylene wax having a concentration of 1.0 mass %, glycerol having a concentration of 20 mass %, triethylene glycol having a concentration of 4.0 mass %, propylene glycol having a concentration of 2.0 mass %, triethylene glycol monobutyl ether having a concentration of 1.0 mass %, a silicone surfactant having a concentration of 0.3 mass %, and deionized water being the balance.

Subsequently, the method for evaluating the performance of the example inks and the performance of the comparative example inks will be described.

In FIGS. 1 and 2, the example inks and the comparative example inks are evaluated for color properties, fastness properties, and stability as the ink performance. As the color properties, brightness and saturation are evaluated. As the fastness properties, dry cleaning contamination degree and rubbing fastness degree are evaluated. As the stability, preservation and aggregate are evaluated.

The results of evaluation of brightness and saturation regarding color properties, the results of evaluation of dry cleaning contamination degree and rubbing fastness degree regarding fastness properties, and the results of evaluation of preservation and aggregate regarding stability are indicated by symbols A, B, and C.

In the evaluation regarding the color properties, the fastness properties, and the stability, the evaluation results indicated by symbol A or B represent performance that can be put to practical use. The evaluation results indicated by symbol C represent performance that is hardly put to practical use. Symbol A indicates that the performance is most excellent, symbol B indicates that the performance is inferior to symbol A and superior to symbol C, and symbol C indicates that the performance is the worst. When the results of evaluation regarding the color properties, the fastness properties, and the stability are all symbol A or symbol B, it can be determined that the effects of the present disclosure are obtained.

In the following explanation, symbol C is referred as grade C, symbol B is referred to as grade B, and symbol A is referred to as grade A.

Method for Producing Sample for Evaluation of Ink Performance

In the embodiment, images are formed on fabrics by example inks and comparative example inks, and the fabrics on which the images are formed are used as samples for evaluation of ink performance, such as color properties and fastness properties. For example, the color properties of an ink are the color properties of a fabric on which an image is formed by the ink, and the fastness properties of an ink are the fastness properties of a fabric on which an images is formed by the ink. The stability of an ink is the stability of the ink itself.

A method for producing a sample for evaluation of ink performance, i.e., a fabric on which an image is formed will now be described.

As the fabric, white cotton broad cloth is used.

First, the fabric is subjected to pretreatment with a water-soluble cationic polymer. As the water-soluble cationic polymer, Unisense 104L (trade name) manufactured by Senka Corporation can be used.

For details, a fabric is subjected to pretreatment by padding with a pretreatment agent composed of 6.7 parts of a water-soluble cationic polymer and 93.3 parts of water by a pad method at a drawing rate of 70% and then drying at 120° C. for 5 minutes.

Subsequently, a color ink composition is adhered to the pretreated fabric by an ink jet system using an ink jet printer to form an image on the fabric. As the ink jet printer, SC-F2000 (product name) manufactured by Seiko Epson Corporation can be used.

In the evaluation of brightness and saturation, an image is formed on a fabric at a resolution of 1440×720 dpi such that the Duty pattern of the color ink composition is 10% to 100%. Incidentally, the application quantity of an ink at a Duty pattern of 100% is 20 g/m$^2$.

In the evaluation of dry cleaning contamination degree and rubbing fastness degree, an image is formed on a fabric by solid printing at a solution of 1440×720 dpi and a Duty pattern of 100%. Incidentally, the solid printing means that ink droplets land on all the pixels as the minimum recording units.

Finally, the fabric on which the image is formed is dried at 160° C. for 5 minutes with a high-temperature steamer.

The above-described is a method for producing a sample for evaluation of ink performance.

Method for Evaluation of Color Properties

The brightness and the saturation regarding the color properties are evaluated by measuring the values of L*, A*, and b* of an image of a Duty pattern of 10% to 100% using a colorimeter Spectrolino manufactured by GretAg.

For example, when the minimum brightness is less 40, since a dark purple color can be expressed, it is judged that its practical use is possible; and when the minimum brightness is 40 or more, since a dark purple color cannot be expressed, it is judged that its practical use is difficult. In the evaluation of brightness regarding the color properties, when the minimum brightness is less than 32, it is ranked as grade A. When the minimum brightness is 32 or more and less than 40, it is ranked as grade B. When the minimum brightness is 40 or more, it is ranked as grade C.

The saturation regarding color properties can be represented by the following expression (1):

$$\text{Saturation} = ((A^*)^2 + (b^*)^2))^{1/2} \quad (1)$$

In saturation, a larger value indicates a brighter color.

In the evaluation of saturation regarding the color properties, when the maximum saturation is 51 or more, it is ranked as grade A; when the maximum saturation is 48 or more and less than 51, it is ranked as grade B; and when the maximum saturation is less than 48, it is ranked as grade C.

When ranked as grade B or grade A, the color reproduction area in the purple color direction is extended, and its practical use is possible. When ranked as grade C, the color reproduction area in the purple color direction is not extended, compared to the case of a saturation of grade B or grade A, and its practical use is difficult.

Method for Evaluating Fastness Properties

The dry cleaning contamination degree regarding the fastness properties refers to the degree of contamination, by the pigment flowing out from a printed fabric subjected to dry cleaning, to another fabric.

The dry cleaning contamination degree is evaluated in accordance with the method A of "Test method for color fastness to dry cleaning (JIS L 0860)". For details, a fabric on which an image has been formed is subjected to dry cleaning together with another fabric, the degree of contamination to the other fabric is determined by measuring the initial value of the image concentration (OD value) before dry cleaning and the image concentration (OD value) after dry cleaning with a Macbeth densitometer, and the difference between them is defined as the dry cleaning contamination degree. As the Macbeth densitometer, for example, TD-931 (product name) manufactured by Macbeth Corporation is used.

In the evaluation of dry cleaning contamination degree regarding the fastness properties, a dry cleaning contamination degree of 5th grade is ranked as grade A, a dry cleaning contamination degree of 4th grade or more and less than 5th grade is ranked as grade B, and a dry cleaning contamination degree of less than 4th grade is ranked as grade C.

When a fabric on which an image has been formed is subjected to dry cleaning together with another fabric, a better result of the evaluation of dry cleaning contamination degree means lighter contamination to the other fabric. When the dry cleaning contamination degree is grade A, the contamination to another fabric is minimal. When the dry cleaning contamination degree is grade B, the contamination to another fabric is severer than that when the dry cleaning contamination degree is grade A and is lighter than that when the dry cleaning contamination degree is grade C. When the dry cleaning contamination degree is grade C, the contamination to another fabric is most severe.

When the dry cleaning contamination degree is grade A or grade B, it is a state of allowing practical use. When the dry cleaning contamination degree is grade C, it is a state of being difficult to put to practical use.

The rubbing fastness degree regarding fastness properties is a degree of contaminating another substance by friction and indicates the degree of color transfer to another fabric by rubbing them with each other.

The rubbing fastness degree can be determined by a rubbing fastness test (dry test) that is performed in accordance with JIS L0849 by friction tester II using a Gakushin-type AB-301, a product manufactured by Tester Sangyo Co., Ltd. In the rubbing fastness test, the load is 200 g, the number of reciprocating movements is 100, and the friction cloth is a white cloth for JIS dye fastness test (JIS L0803 compliant No. 3-17, shirting No. 3). The grade is visually determined using a gray scale to evaluate the rubbing fastness degree.

In the evaluation of rubbing fastness degree regarding the fastness properties, a rubbing fastness degree of 4th grade or more is ranked as grade A. A rubbing fastness degree of 3rd grade or more and less than 4th grade is ranked as grade B. A rubbing fastness degree of less than 3rd grade is ranked as grade C.

A better result of the evaluation of rubbing fastness degree means lighter color transfer from a fabric on which an image has been formed to another fabric. When the rubbing fastness degree is grade A, the color transfer to another fabric is minimal. When the rubbing fastness degree is grade B, the color transfer to another fabric is severer than that when the rubbing fastness degree is grade A and is lighter than that when the rubbing fastness degree is grad C. When the rubbing fastness degree is grade C, the color transfer to another fabric is most severe.

When the rubbing fastness degree is grade A or grade B, it is a state of allowing practical use. When the rubbing fastness degree is grade C, it is a state of being difficult to put to practical use.

Method for Evaluating Stability

The preservation regarding the stability indicates the degree of changes of physical properties, such as viscosity and surface tension, over time when stored for a long period of time.

An example ink or a comparative example ink is placed in a glass sample bottle and sealed, and the sealed glass bottle containing the example ink or the comparative example ink is stored in an environment of 50° C. for 14 days. Subsequently, the viscosity of the ink stored in the glass bottle for 14 days is measured at 25° C. condition using a viscoelastic testing machine MCR-300 (product name) of PysicA. The rate of change in viscosity of the ink stored for 14 days is calculated from the difference between the viscosity of the ink at the initial stage (immediately after preparation) and the viscosity of the ink after the storage for 14 days.

In the evaluation of preservation regarding the stability, when the rate of change in viscosity of the example ink or the comparative example ink stored for 14 days is less than ±5%, the preservation is ranked as grade A. When the rate of change in viscosity of the example ink or the comparative example ink stored for 14 days is ±5% or more and less than ±10%, the preservation is ranked as grade B. When the rate of change in viscosity of the example ink or the comparative example ink stored for 14 days is ±10% or more, the preservation is ranked as grade C.

When the preservation is grade A or grade B, it is a state of allowing practical use. When the preservation is grade C, it is a state of being difficult to put to practical use. For example, if an ink of which the preservation is grade C is used in an ink jet printer, the amount of the ink droplets landing on pixels as the minimum recording units varies, and there is a risk of decreasing the quality of the image formed on a fabric.

Aggregate is generated when the resin particles are entangled with each other or when the resin particles collide with each other by application of mechanical impact from the outside. For example, even if the concentrations of resin particles are the same, entangling between the resin particles or collision between the resin particles tends to occur when the concentration of the pigment is decreased to relatively increase the ratio of the resin particle concentration to the pigment concentration, and aggregate tends to be generated in the ink.

In the evaluation of aggregate regarding the stability, first, 10 mL of an example ink or 10 mL of a comparative example ink is placed in a glass sample bottle and sealed, and the sealed glass bottle containing the ink is stored in an environment of 50° C. for 14 days. Subsequently, 10 mL of the ink stored for 14 days is filtered through filter paper (No. 5A, manufactured by Advantec Co., Ltd.), and the number of aggregate remaining on the filter paper is then visually counted to evaluate the aggregate regarding the stability.

In the evaluation of aggregate regarding the stability, when the number of aggregate generated in the ink stored for 14 days is 9 or less, the aggregate is ranked as grade A. When the number of aggregate generated in the ink stored for 14 days is 10 or more and 49 or less, the aggregate is ranked as grade B. When the number of aggregate generated in the ink stored for 14 days is 50 or more, the aggregate is ranked as grade C.

When the aggregate is grade A or grade B, it is a state of allowing practical use. When the aggregate is grade C, it is a state of being difficult to put to practical use. For example, if an ink of which the aggregate is grade C is ejected from a nozzle of the head of an ink jet printer, there is a risk of clogging the nozzle by the aggregate.

Finally, with reference to FIGS. 1 and 2, the components of example inks will be described comparing comparative example inks.

The inks of Examples 1 to 3 differ from the inks of Comparative Examples 1 and 2 in the concentration of the dioxazine pigment among a plurality of ink compositions, and other conditions of the ink compositions are the same.

The concentrations of the dioxazine pigment in the inks of Examples 1 to 3 are 0.5 mass % or more and 1.5 mass % or less, whereas the concentration of the dioxazine pigment in the ink of Comparative Example 1 is 2.0 mass %, and the concentration of the dioxazine pigment in the ink of Comparative Example 2 is 0.4 mass %.

The results of evaluation of the inks of Examples 1 to 3 and the inks of Comparative Examples 1 and 2 demonstrate the followings: When the concentration of the dioxazine pigment is within a range of 0.5 mass % or more and 1.5 mass % or less, the evaluation items regarding ink performance are all B or higher, and the ink may be used as an ink of, for example, an ink jet printer. In contrast, when the concentration of the dioxazine pigment is 0.4 mass % and when the concentration of the dioxazine pigment is 2.0 mass %, either the brightness or the saturation regarding color properties becomes grade C, and the ink is not suitable for, for example, an ink jet printer. That is, when the concentration of the dioxazine pigment is 0.5 to 1.5 mass %, excellent color properties allowing practical use are obtained.

Accordingly, the content of the dioxazine pigment in an example ink may be 0.5 to 1.5 mass % based on the total amount of the ink composition. That is, in an ink containing a dioxazine pigment, a resin particle, and a lubricant, the content of the dioxazine pigment may be 0.5 to 1.5 mass % based on the total amount of the ink composition.

Incidentally, the ink containing a dioxazine pigment, a resin particle, and a lubricant is a textile printing ink jet ink composition according to the present application. In the following explanation, the example ink may be described as an ink containing a dioxazine pigment, a resin particle, and a lubricant.

The ink of Example 1 differs from the ink of Comparative Example 3 in the type of the pigment, and the conditions other than the pigment are the same. That is, the pigment in the ink of Example 1 is a dioxazine pigment (C.I. Pigment Violet 23). The pigment of the ink of Comparative Example 3 is a non-dioxazine pigment (C.I. Pigment Violet 19 (quinacridone pigment)).

The ink of Example 1 is grade A in all evaluation items and has excellent ink performance allowing practical use.

In contrast, although the ink of Comparative Example 3 is grade A in the saturation regarding color properties, the fastness properties, and the stability, the brightness regarding color properties is grade C, and the ink is difficult to put to practical use.

As described above, the dioxazine pigment is a polycyclic pigment including two oxazine rings in one molecular and has characteristics of excellent color development properties, light resistance, heat resistance, and so on. In contrast, the quinacridone pigment has characteristics of excellent heat resistance and solvent resistance.

The results of evaluation of the ink of Example 1 and the ink of Comparative Example 3 demonstrate that the dioxazine pigment has excellent color properties at a low pigment concentration compared to the quinacridone pigment. Incidentally, the quinacridone pigment has excellent color properties at a high pigment concentration compared to the dioxazine pigment.

The results of evaluation of the inks of Examples 1 to 3 demonstrate that color properties proper for practical use are obtained when the concentration of the dioxazine pigment is 0.5 to 1.5 mass %. In contrast, when a quinacridone pigment is used as a non-dioxazine pigment, the concentration of the quinacridone pigment giving color properties proper for practical use is about 4 mass %. When the quinacridone pigment is contained in such a concentration, the rubbing fastness degree is inferior due to the high pigment concentration, and it is difficult to put to practical use. Thus, the dioxazine pigment provides excellent color properties at a low pigment concentration compared to the quinacridone pigment, the color development properties are improved, and the rubbing fastness degree can be improved.

Accordingly, in an ink containing a pigment, a resin particle, and a lubricant, the pigment may be a dioxazine pigment.

As the dioxazine pigment, not only C.I. Pigment Violet 23 but also C.I. Pigment Violet 37 can be used.

C.I. Pigment Violet 23 exhibits a brilliant purple color, and C.I. Pigment Violet 37 exhibits a reddish purple color. That is, C.I. Pigment Violet 23 exhibits a pure purple color with no redness or blueness compared to C.I. Pigment Violet 37. From such a viewpoint of exhibiting a pure purple color with no redness or blueness, C.I. Pigment Violet 23 is superior to C.I. Pigment Violet 37.

Accordingly, in an ink containing a dioxazine pigment, a resin particle, and a lubricant, the dioxazine pigment may be C.I. Pigment Violet 23.

The ink of Comparative Example 4 does not contain resin particles, and the ink of Example 1 contains resin particles. Furthermore, the concentration of the dioxazine pigment and the concentration of the lubricant in the ink of Comparative Example 4 are the same as the concentration of the dioxazine pigment and the concentration of the lubricant in the ink of Example 1. That is, whether resin particles are contained or not is a main difference between the ink of Comparative Example 4 and the ink of Example 1.

The fastness properties of the ink of Comparative Example 4 are grade C, and the fastness properties regarding ink performance are inferior compared to the ink of Example 1. If an ink does not contain resin particles, the pigment is not fixed to a fabric in a state in which the pigment is included in a resin film, the color material tends to detach from the fabric by dry cleaning or friction, and the fastness properties are deteriorated, compared to when the pigment is fixed to a fabric in a state in which the pigment is included in a resin film.

Thus, the resin particles form a resin film including the pigment, have a function for enhancing the fastness properties of a printed fabric, and are an essential component of the example ink. Accordingly, the example ink contains resin particles in addition to a dioxazine pigment and a lubricant.

The ink of Example 1 and inks of Examples 4 to 7 differ from each other in the concentration of the resin particles among a plurality of ink compositions, and the conditions regarding other ink compositions are the same. The resin particle concentrations of the ink of Example 7, the ink of Example 5, the ink of Example 1, the ink of Example 4, and the ink of Example 6 increase in this order. The resin particle concentrations of the ink of Example 1 and the inks of Examples 4 to 7 are 3.0 mass % or more and 6.0 mass % or less.

The ink of Example 1 is ranked as grade A in all evaluation items regarding ink performance. The ink of Example 4, the ink of Example 5, and the ink of Example 7 are ranked as grade B in one of evaluation items regarding ink performance and ranked as grade A in other evaluation items. The ink of Example 6 is ranked as grade B in two of evaluation items regarding ink performance and ranked as grade A in other evaluation items. Thus, the ink of Example 1 and the inks of Examples 4 to 7 are ranked as grade A or grade B in ink performance and have excellent ink performance allowing practical use.

Accordingly, in an ink containing a dioxazine pigment, a resin particle, and a lubricant, the content of the resin particles may be 3.0 to 6.0 mass % based on the total amount of the ink composition.

As described above, the example ink includes a dioxazine pigment as a pigment, and the concentration of the pigment is lower than that of the quinacridone pigment included in the ink of Comparative Example 3 as the pigment.

However, the ratio of the concentration of the resin particle to the concentration of the pigment is relatively increased with a decrease in the concentration of the pigment, and collision between the resin particles tends to occur and aggregate due to the collision between the resin particles tends to be generated, compared to the case in which the ratio of the concentration of the resin particle to the concentration of the pigment is relatively low. For example, when an ink containing a dioxazine pigment is transported, collision between resin particles tends to occur by the vibration during the transportation, and aggregate due to collision between the resin particles tends to be generated.

Furthermore, if the water evaporates, the concentration of the resin particles is relatively increased in the vicinity of the gas-liquid interface, and collision between the resin particles tends to occur, and aggregate due to the collision between the resin particles tends to be generated.

Thus, an ink containing a dioxazine pigment has a harmful influence by the advantage that the concentration of the pigment can be decreased, that is, a weak point that aggregate due to collision between resin particles tends to generated.

The ink of Comparative Example 5 does not include a lubricant, whereas the ink of Example 1 includes a lubricant. The concentration of the dioxazine pigment and the concentration of the resin particles in the ink of Comparative Example 5 are the same as the concentration of the dioxazine pigment and the concentration of the resin particles in the ink of Example 1. That is, the main difference between the ink of Comparative Example 5 and the ink of Example 1 is whether a lubricant is contained or not.

The ink of Comparative Example 5 is ranked as grade C in the aggregate among the evaluation items regarding stability and tends to generate aggregate compared to the ink of Example 1.

It is inferred that since the lubricant penetrates between the resin particles to reduce collision between the resin particles and consequently suppresses the generation of aggregate due to collision between the resin particles, the ink not containing a lubricant of Comparative Example 5 tends to generate aggregate and the ink containing a lubricant of Example 1 hardly generates aggregate. That is, the lubricant overcomes a harmful influence by the advantage that the concentration of a dioxazine pigment contained in an ink can be decreased, that is, a weak point that aggregate due to collision between resin particles tends to be generated.

Thus, the lubricant is an essential component of the example ink. In the embodiment, optimization of the concentration of the lubricant has been attempted.

The ink of Example 1, the ink of Example 14, and the ink of Example 15 differ from each other in the concentration of the lubricant among a plurality of ink compositions, and the conditions regarding other ink compositions are the same. For details, the concentration of the lubricant in the ink of Example 1 is 1.0 mass %, the concentration of the lubricant in the ink of Example 14 is 2.5 mass %, and the concentration of the lubricant in the ink of Example 15 is 0.4 mass %.

The ink of Example 1 is ranked as grade A in all evaluation items regarding ink performance. The ink of Example 14 and the ink of Example 15 are ranked as grade B in the preservation and aggregate in the evaluation items regarding ink performance and ranked as grade A in other evaluation items.

Thus, the ink of Example 1, the ink of Example 14, and the ink of Example 15 have ink performance allowing practical use and may be used as inks for, for example, an ink jet printer.

Accordingly, in an ink containing a dioxazine pigment, a resin particle, and a lubricant, the content of the lubricant may be 0.4 to 2.5 mass % based on the total amount of the ink composition.

The lubricant forms a protective layer protecting a colored coating film formed by the pigment and the resin particles, and when a strong external force is locally applied to an image formed by the colored coating film, the protective layer is deformed to suppress the abrasion of the colored coating film. As a result, the image formed by the colored coating film is hardly deteriorated, for example, color fade-out due to damage to the colored coating film hardly occurs to improve the abrasion resistance.

The ink of Example 1, the ink of Example 12, and the ink of Example 13 are the same in the concentration of the ink composition but differ from each other in the type of the lubricant. For details, the lubricant 1 in Example 1 is a polyethylene wax having a high melting point of 137° C. The lubricant 2 in Example 12 is a polyethylene wax having a low melting point of 106° C. The lubricant 3 in Example 13 is a paraffin wax having a melting point of 90° C.

The ink of Example 1, i.e., an ink including a polyethylene wax having a high melting point as the lubricant is ranked as grade A in all the color properties, the fastness properties, and the stability. The ink of Example 12, i.e., an ink including a polyethylene wax having a low melting point as the lubricant is ranked as grade A in the color properties and the fastness properties and is ranked as grade B in the stability of preservation. The ink of Example 13, i.e., an ink including a paraffin wax as the lubricant is ranked as grade A in the color properties and the fastness properties and is ranked as grade B in both items regarding stability.

Since a lubricant having a low melting point is generally low in crystallinity, the polarizability is weak, and dispersoids, such as the lubricant and the resin, collide with each other to easily generate aggregate. In addition, in a lubricant having a low melting point, the solid content partially melts during storage under a high temperature, such as 50° C., to cause an increase in the rate of change in viscosity and a change in the particle diameter. The polyethylene wax is a synthetic wax derived from petroleum and generally has a higher melting point than natural waxes (such as carnauba wax) and is therefore more excellent in storage stability of the ink. Since a lubricant having a melting point of 130° C. or more has sufficient polarizability, aggregate due to collision between dispersoids including the lubricant hardly occurs.

Thus, the ink including a polyethylene wax having a high melting point as the lubricant (ink of Example 1), the ink including a polyethylene wax having a low melting point as the lubricant (ink of Example 12), and the ink including a paraffin wax as the lubricant (ink of Example 13) have ink performance allowing practical use and may be used as inks for, for example, an ink jet printer. From the viewpoint of stability, the lubricant may be polyethylene wax or a polyethylene wax having a melting point of 130° C. or more.

The ink of Example 1, the ink of Example 8, and the ink of Example 9 are the same in the concentration of the ink composition but differ from each other in the type of the resin.

The resin 1 in the ink of Example 1 is a urethane resin having a block isocyanate crosslinkable group. The resin 2 in the ink of Example 8 is a urethane resin having no crosslinkable group. The resin 3 in the ink of Example 9 is an acrylic resin having a crosslinkable group.

The ink of Example 1, i.e., an ink including a urethane resin having a block isocyanate crosslinkable group as the resin particle is ranked as grade A in all the color properties, the fastness properties, and the stability. The ink of Example 8, i.e., an ink including a urethane resin having no crosslinkable group as the resin particle is ranked as grade A in the color properties and the stability and is ranked as grade B in the fastness properties. The ink of Example 9, i.e., an ink including an acrylic resin having a crosslinkable group as the resin particle is ranked as grade A in the color properties and is ranked as grade B in the fastness properties and the stability.

Thus, the ink performance is improved in an ink including an acrylic resin having a crosslinkable group as the resin particle (ink of Example 9), an ink including a urethane resin having no crosslinkable group as the resin particle (ink of Example 8), and an ink including a urethane resin having a block isocyanate crosslinkable group as the resin particle (ink of Example 1) in this order. That is, inks including a urethan resin as the resin particle (inks of Examples 1 and 8) has enhanced performance regarding stability compared to an ink including an acrylic resin as the resin particle (ink of Example 9).

Accordingly, in an ink containing a dioxazine pigment, a resin particle, and a lubricant, the resin particle may be a urethane resin particle.

Since the urethane resin has a hard segment and a soft segment in the basic skeleton, it improves the toughness of the resin film has and imparts tenacity to the resin film, compared to the acrylic resin. Consequently, the urethane resin is more resistant to sliding and bending than the acrylic resin. Furthermore, the urethane resin having a block isocyanate crosslinkable group further improves the toughness of the resin film, compared to the urethane resin having no crosslinkable group.

Consequently, the ink including resin particles of a urethane resin having a block isocyanate crosslinkable group (ink of Example 1) enhances the flexibility and abrasion resistance in the printed part of a fabric and improves the performance regarding fastness properties, compared to the ink including resin particles of a urethane resin having no crosslinkable group (ink of Example 8) and the ink including resin particles of an acrylic resin (ink of Example 9).

Accordingly, in the ink including a dioxazine pigment, a resin particle, and a lubricant, the resin particle may be a particle of a urethane resin having a crosslinkable group.

Furthermore, in the ink including a dioxazine pigment, a resin particle, and a lubricant, when the resin particle is a particle of a urethane resin having a crosslinkable group, the crosslinkable group may be block isocyanate.

As the urethane resin, for example, a urethane resin having a urethane group in the basic skeleton, a polyether urethane resin having an ether bond in the basic skeleton in addition to the urethane group, a polyester urethane resin having an ester bond in the basic skeleton in addition to the urethane group, or a polycarbonate urethane resin having a carbonate bond in the basic skeleton in addition to the urethane group can be used. These urethane resins may be used alone or in combination of two or more thereof.

The polycarbonate urethane resin is a urethane resin having a polycarbonate skeleton and is excellent in toughness and tenacity compared to other urethane resins.

Accordingly, in an ink including a dioxazine pigment, a resin particle, and a lubricant, the resin particle may be a particle of a resin having a polycarbonate skeleton.

Examples Corresponding to Embodiment 2

FIG. 3 is a table showing a relationship between the composition and the performance of a textile printing ink jet ink composition set according to Embodiment 2 and a relationship between the composition and the performance of a textile printing ink jet ink composition set according to Comparative Example.

The outline and the features of a textile printing ink jet ink composition set according to this embodiment will now be described with reference to FIG. 3.

Incidentally, in the following description, a textile printing ink jet ink composition set according to the embodiment is referred to as an example ink set, and a textile printing ink jet ink composition set according to Comparative Example is referred to as a comparative example ink set.

Furthermore, differences from Embodiment 1 will be mainly described, and the description overlapping with Embodiment 1 will be omitted.

As shown in FIG. 3, the example ink set includes the ink of Example 1, ink H, and ink I. The comparative example ink set includes ink H and ink I. The ink of Example 1 is a violet ink composition containing a dioxazine pigment exhibiting a purple color. The ink H is a cyan ink composition containing a phthalocyanine pigment exhibiting a cyan color. The ink I is a magenta ink composition.

That is, the example ink set includes a violet ink composition (ink of Example 1) containing a violet ink composition containing a dioxazine pigment exhibiting a purple color in addition to a cyan ink composition (ink H) containing a phthalocyanine pigment exhibiting a cyan color and a magenta ink composition (ink I). The comparative example ink set includes a cyan ink composition (ink H) containing a phthalocyanine pigment exhibiting a cyan color and a magenta ink composition (ink I). This point is a difference between the example ink set and the comparative example ink set.

The example ink set and the comparative example ink set are used as inks for an ink jet printer. An ink jet printer provided with the example ink set ejects the ink of Example 1, the ink H, and the ink I onto a fabric to form an image of a color in a blue region. An ink jet printer provided with the comparative example ink set ejects the ink H and the ink I onto a fabric to form an image of a color in a blue region.

The ink H includes a pigment dispersion 3.

The pigment dispersion 3 is prepared by mixing 1.5 parts by mass of 30 mass % ammonia (neutralizer) with 80.5 parts by mass of deionized water, stirring the mixture, then dissolving 8 parts by mass of an acrylic-acrylate copolymer as a resin dispersant in the mixture, further adding 10 parts by mass of a pigment to the mixture, and performing dispersion treatment for 10 hours with a ball mill using zirconia beads. The pigment concentration in the pigment dispersion 3 is 10 mass %.

The pigment as an effective component included in the pigment dispersion 3 is a phthalocyanine pigment being C.I. Pigment Blue 15:3. That is, the ink H is a cyan ink composition containing C.I. Pigment Blue 15:3 as a phthalocyanine pigment and is therefore a cyan ink.

The ink I includes a pigment dispersion 4.

The pigment dispersion 4 is prepared by mixing 1.5 parts by mass of 30 mass % ammonia (neutralizer) with 80.5 parts by mass of deionized water, stirring the mixture, then dissolving 8 parts by mass of an acrylic-acrylate copolymer as a resin dispersant in the mixture, further adding 10 parts by mass of a pigment to the mixture, and performing dispersion treatment for 10 hours with a ball mill using zirconia beads. The pigment concentration in the pigment dispersion 4 is 10 mass %.

The pigment as an effective component included in the pigment dispersion 4 is C.I. Pigment Red 202.

The ink of Example 1 contains a resin 1, a lubricant 1, an organic solvent, a surfactant, and water, in addition to a dioxazine pigment. The ink H contains a resin 1, a lubricant 1, an organic solvent, a surfactant, and water, in addition to a phthalocyanine pigment.

The ink of Example 1 and the ink H are the same in the concentration of the resin 1, the concentration of the lubricant 1, the concentration of the organic solvent, and the concentration of the surfactant. That is, the concentration of the resin 1 is 5.0 mass %, the concentration of the lubricant 1 is 1.0 mass %, the concentration of glycerol is 20 mass %, the concentration of triethylene glycol is 4.0 mass %, the concentration of propylene glycol is 2.0 mass %, the concentration of triethylene glycol monobutyl ether is 1.0 mass %, and the concentration of BYK-348 as the surfactant is 0.3 mass %.

The ink of Example 1 and the ink H differ from each other in the concentration of the pigment. The concentration of the dioxazine pigment in the ink of Example 1 is 1.0 mass %, and the concentration of the phthalocyanine pigment in the ink H is 4.0 mass %. As described above, since the dioxazine pigment has excellent color development properties compared to the non-dioxazine pigment (phthalocyanine pigment), the concentration of the pigment in the ink of Example 1 containing the dioxazine pigment is low compared to the ink H containing the non-dioxazine pigment (phthalocyanine pigment).

Thus, the ink of Example 1 includes a smaller amount of a pigment than the ink H, and the ink H includes a larger amount of a pigment than the ink of Example 1.

Method for Evaluating Fastness Properties

FIG. 3 summarizes the results of evaluation of the rubbing fastness degree regarding fastness properties.

An image of a color in a blue region is formed on a fabric by an example ink set or a comparative example ink set, and the fabric on which the image of a color in a blue region has been formed is used as a sample for evaluating ink performance, and the rubbing fastness degree is evaluated. Here, the sample for evaluating ink performance is produced as in the method for producing sample for evaluation of ink performance described in the section "Example corresponding to Embodiment 1" above, except that each ink of the example ink set or each ink of the comparative example ink set is ejected from different nozzle rows of an ink jet printer and that as the image of a color in a blue region, an image having a* of −10 to 15 and b* of −25 to −50 in L*a*b* values is formed.

The resulting samples for evaluating ink performance are evaluated for rubbing fastness degree. The evaluation of the rubbing fastness degree is performed as in "Example corresponding to Embodiment 1" described above.

The rubbing fastness degree of the example ink set is ranked as grade A. That is, the rubbing fastness degree of a fabric on which an image of a color in a blue region is formed by the ink of Example 1, the ink H, and the ink I is ranked as grade A. The rubbing fastness degree of the comparative example ink set is ranked as grade B. That is, the rubbing fastness degree of a fabric on which an image of a color in a blue region is formed by the ink H and the ink I is ranked as grade B.

Incidentally, the rubbing fastness degree of the ink of Example 1 is ranked as grade A (see FIG. 1).

Thus, the example ink set is superior in the rubbing fastness degree regarding fastness properties to the comparative example ink set.

Since the example ink set includes a violet ink composition containing a dioxazine pigment in addition to a cyan ink composition containing a phthalocyanine pigment, the color reproduction area in the blue region is extended, compared to the comparative example ink set including a phthalocyanine pigment only.

The blue region indicates a region in which a* is −10 to 15 and b* is −25 to −50 in L*a*b* values. Since the ink of Example 1, which is a violet ink composition, shows a high saturation in a vector different from that of the cyan ink composition containing a phthalocyanine pigment in a range of a* of −10 to 15 and b* of −25 to −50, the example ink set including a violet ink composition containing a dioxazine pigment in addition to a cyan ink composition containing a phthalocyanine pigment extends the blue region and can widen the color reproduction area in a blue color region.

Since the ink H include a large amount of a pigment compared to the ink of Example 1, in a colored coating film formed by the ink H, the concentration of the pigment is high and the concentration of the resin is low, compared to those in a colored coating film formed by the ink of Example 1. On the other hand, in the colored coating film formed by the ink of Example 1, the concentration of the pigment is low and the concentration of the resin is high, compared to those in the colored coating film formed by the ink H.

The mechanical strength of a colored coating film depends on the concentration of the resin in the colored coating film. The mechanical strength of a colored coating film is decreased with a decrease in the concentration of the resin in the colored coating film, and the mechanical strength of a colored coating film is increased with an increase in the concentration of the resin in the colored coating film.

Accordingly, in the colored coating film formed by the ink H, the mechanical strength is low and the rubbing fastness degree is low, compared to the colored coating film formed by the ink of Example 1. In the colored coating film formed by the ink of Example 1, the mechanical strength is high and the rubbing fastness degree is high, compared to the colored coating film formed by the ink H.

A fabric on which an image is formed by the example ink set includes a colored coating film formed by the ink of Example 1, a colored coating film formed by the ink H, and a colored coating film formed by the ink I. On the other hand, a fabric on which an image is formed by the comparative example ink set does not include a colored coating film formed by the ink of Example 1.

Accordingly, in the fabric on which an image is formed by the example ink set, the fastness properties are improved compared to the fabric on which an image is formed by the comparative example ink set, and the rubbing fastness degree is improved to grade A. That is, in the fabric on which an image is formed by the example ink set, the rubbing fastness degree is enhanced by the colored coating film formed by the ink of Example 1, and the rubbing fastness degree is improved to grade A.

Thus, the example ink set including the ink of Example 1 and the ink H can have a new effect of improving the fastness properties, in addition to an effect of widening the color reproduction area in a blue color region, compared to the comparative example ink set that does not include the ink of Example 1.

Incidentally, the example ink set is not limited to the composition including the ink of Example 1 and the ink H and may be a composition including the ink of Example 3 and the ink H, a composition including the ink of Example 4 and the ink H, a composition including the ink of Example 6 and the ink H, a composition including the ink of Example 10 and the ink H, or a composition including any one of the inks of Examples 12 to 15 and the ink H.

That is, the example ink set may be any composition including a violet ink composition containing a dioxazine pigment in addition to a cyan ink composition containing a phthalocyanine pigment.

Consequently, the example ink set can have a new effect of improving the fastness properties in addition to an effect of widening the color reproduction area in a blue color region.

Accordingly, the textile printing ink jet ink composition set in the embodiment may be a composition including a textile printing ink jet ink composition of the example (violet ink composition including a dioxazine pigment) and a cyan ink containing a phthalocyanine pigment.

The content derived from the embodiment will now be described.

The textile printing ink jet ink composition of the present application contains a dioxazine pigment, a resin particle, and a lubricant, wherein the content of the dioxazine pigment is 0.5 to 1.5 mass % based on the total amount of the ink composition.

The dioxazine pigment is a polycyclic pigment including two oxazine rings in one molecular and has excellent color properties at a low pigment concentration and is excellent in color development properties.

For details, in an ink containing a dioxazine pigment, a resin particle, and a lubricant, if the content of the dioxazine pigment is higher than 1.5 mass % based on the total amount of the ink composition, although a deep color can be reproduced, a light color is difficult to reproduce. If the content of the dioxazine pigment is less than 0.5 mass % based on the total amount of the ink composition, although a light color can be reproduced, a deep color is difficult to reproduce. When the content of the dioxazine pigment is 0.5 to 1.5 mass % based on the total amount of the ink composition, a deep color, in addition to a light color, can be reproduced. Accordingly, in an ink containing a dioxazine pigment, a resin particle, and a lubricant, the content of the dioxazine pigment may be 0.5 to 1.5 mass % based on the total amount of the ink composition.

For example, when a quinacridone pigment is used as a non-dioxazine pigment instead of the dioxazine pigment, the content of the non-dioxazine pigment for reproducing a deep color in addition to a light color is higher than 1.5 mass %, about 4 mass %, based on the total amount of the ink composition.

Thus, when a dioxazine pigment is used as a color material and the content of the dioxazine pigment is 0.5 to 1.5 mass % based on the total amount of the ink composition, excellent color properties can be obtained at a low pigment concentration, compared when a non-dioxazine pigment is used as the color material, and color development properties are improved.

In the textile printing ink jet ink composition described above, the dioxazine pigment may be C.I. Pigment Violet 23.

As the dioxazine pigment, for example, C.I. Pigment Violet 23 and C.I. Pigment Violet 37 can be used.

C.I. Pigment Violet 23 exhibits a brilliant purple color. C.I. Pigment Violet 37 exhibits a reddish purple color. That is, from the viewpoint of exhibiting a pure purple color with no redness or blueness, C.I. Pigment Violet 23 is superior to C.I. Pigment Violet 37.

Accordingly, the dioxazine pigment, which is a color material exhibiting a purple color, may be C.I. Pigment Violet 23.

In the textile printing ink jet ink composition, the resin particle may be a urethane resin particle.

Since the urethane resin has a hard segment and a soft segment in the basic skeleton, the resin film is imparted with tenacity compared to a resin of which the basic skeleton is a hard segment. Furthermore, the urethane resin forms a resin film having improved toughness compared to a resin of which the basic skeleton is a soft segment. That is, a resin film having excellent toughness and tenacity can be formed by using urethane resin particles.

In contrast, in the textile printing ink jet ink composition of the present application, a resin film containing a pigment, i.e., a colored coating film is formed by resin particles and a pigment. When the resin particles are urethane resin particles, a resin film having excellent toughness and tenacity can be formed. Accordingly, the colored coating film also has excellent toughness and tenacity, and the fastness properties of the colored coating film can be enhanced.

Accordingly, in the result product produced by the textile printing ink jet ink composition of the present application, the fastness properties are enhanced, and the fastness properties are improved.

In the textile printing ink jet ink composition described above, the resin particles may be particles of a resin having a polycarbonate skeleton.

A urethane resin having a polycarbonate skeleton in the basic skeleton can form a resin film having excellent toughness and tenacity, compared to a urethane resin of which the basic skeleton has urethane bonds only. Accordingly, the colored coating film also has excellent toughness and tenacity, and the fastness properties of the result product produced by the textile printing ink jet ink composition of the present application can be enhanced.

In the textile printing ink jet ink composition described above, the resin particles may be particles of a urethane resin containing a crosslinkable group.

In the urethane resin containing a crosslinkable group, since the toughness of the resin film is enhanced, compared to a urethane resin containing no crosslinkable group, the toughness of the colored coating film is enhanced, and the fastness properties of the result product produced by the textile printing ink jet ink composition of the present application can be enhanced.

In the textile printing ink jet ink composition described above, the crosslinkable group may be block isocyanate.

In the resin film formed by resin particles of which the resin includes block isocyanate as the crosslinkable group, since the toughness of the resin film is enhanced, compared to the resin film formed by other resin particles, the toughness of the colored coating film is enhanced, and the fastness properties of the result product produced by the textile printing ink jet ink composition of the present application can be enhanced.

In the textile printing ink jet ink composition described above, the lubricant may be a polyethylene wax.

The polyethylene wax as the lubricant penetrates between the resin particles to reduce collision between the resin particles and consequently suppresses the generation of aggregate due to collision between the resin particles. As a result, the textile printing ink jet ink composition of the present application hardly generates foreign substance, such as aggregate, due to collision between resin particles when stored for a long time, and the preservation is consequently improved.

In the textile printing ink jet ink composition described above, the lubricant may have a melting point of 130° C. or more.

Since a lubricant having a low melting point is generally low in crystallinity, the polarizability is weak, and dispersoids, such as a lubricant and a resin, collide with each other to easily generate aggregate. In addition, in a lubricant having a low melting point, the solid content partially melts during storage under a high temperature, such as 50° C., and an increase in the rate of change in viscosity and a change in the particle diameter are caused. The polyethylene wax is a synthetic wax derived from petroleum and generally has a higher melting point than natural waxes (such as carnauba wax) and is therefore more excellent in storage stability of the ink. Since a lubricant having a melting point of 130° C. or more has sufficient polarizability, aggregate due to collision between dispersoids including the lubricant hardly occurs.

In the textile printing ink jet ink composition described above, the content of the lubricant may be 0.4 to 2.5 mass % based on the total amount of the ink composition.

In textile printing ink jet ink composition in which the content of the lubricant is 0.4 to 2.5 mass % based on the total amount of the ink composition, the lubricant suppresses the generation of aggregate due to collision between resin particles to improve preservation.

Furthermore, in the result product formed by the textile printing ink jet ink composition in which the content of the lubricant is 0.4 to 2.5 mass % based on the total amount of the ink composition, the lubricant suppresses the abrasion of the colored coating film, the image formed by the colored coating film is hardly deteriorated, and the fastness properties are improved.

The textile printing ink jet ink composition set of the present application includes the textile printing ink jet ink composition described above and a cyan ink composition containing a phthalocyanine pigment.

Since the result product formed by the textile printing ink jet ink composition of the present application has enhanced the fastness properties, the fastness properties of the result product formed by the textile printing ink jet ink composition set including the textile printing ink jet ink composition of the present application are also enhanced.

What is claimed is:

1. A textile printing ink jet ink composition comprising:
 a dioxazine pigment;
 a resin particle; and
 a lubricant,
 wherein a content of the dioxazine pigment is 0.5 to 1.5 mass % based on the total amount of the ink composition; and
 wherein a content of the lubricant is 0.4 to 2.5 mass % based on the total amount of the ink composition.

2. The textile printing ink jet ink composition according to claim 1, wherein the dioxazine pigment is C.I. Pigment Violet 23.

3. The textile printing ink jet ink composition according to claim 1, wherein the resin particle is a urethane resin particle.

4. The textile printing ink jet ink composition according to claim 1, wherein the resin particle is a particle of a resin having a polycarbonate skeleton.

5. The textile printing ink jet ink composition according to claim 1, wherein the resin particle is a particle of a urethane resin having a crosslinkable group.

6. The textile printing ink jet ink composition according to claim 5, wherein the crosslinkable group is block isocyanate.

7. The textile printing ink jet ink composition according to claim 1, wherein the lubricant is a polyethylene wax.

8. The textile printing ink jet ink composition according to claim 1, wherein the lubricant has a melting point of 130° C. or more.

9. A textile printing ink jet ink composition set comprising the textile printing ink jet ink composition according to claim 1 and a cyan ink containing a phthalocyanine pigment.

* * * * *